May 12, 1931.  V. W. AUBEL ET AL  1,804,393
HEAT RECUPERATOR OR REGENERATOR STRUCTURE
Filed March 23, 1927
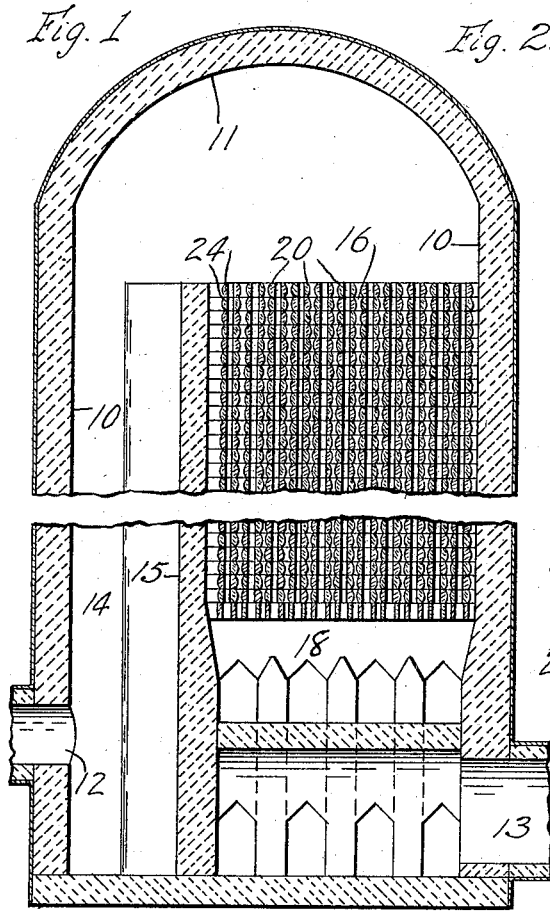
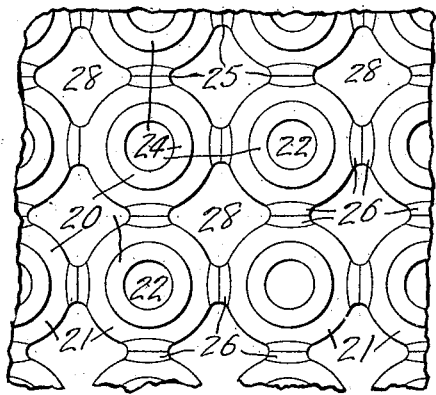
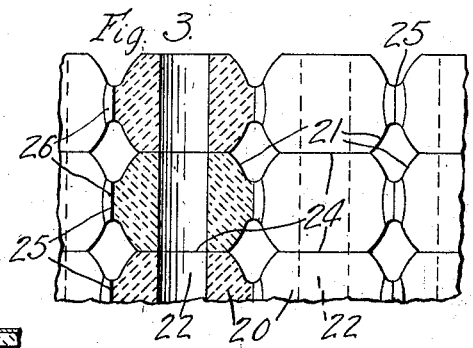
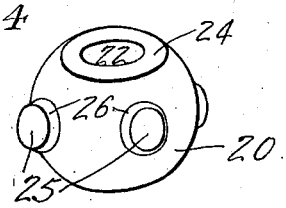
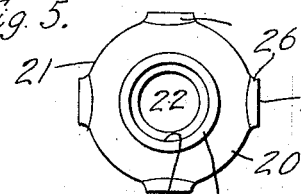
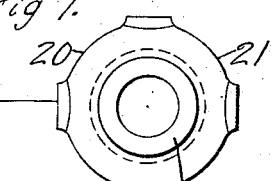
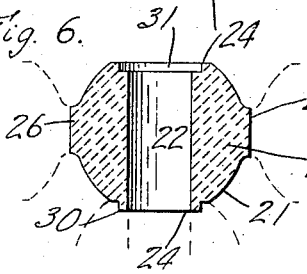
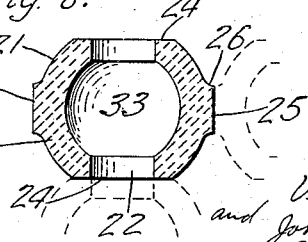
INVENTOR.
Verne W. Aubel
and John B. Fitz-Gibbon
by Parker & Prochnow
ATTORNEYS.

Patented May 12, 1931

1,804,393

UNITED STATES PATENT OFFICE

VERNE W. AUBEL, OF BUFFALO, NEW YORK, AND JOHN B. FITZ-GIBBON, OF BRIDGEBURG, ONTARIO, CANADA

HEAT RECUPERATOR OR REGENERATOR STRUCTURE

Application filed March 23, 1927. Serial No. 177,586.

This invention relates to a furnace or oven construction which may be used for heating air or gas either by first heating the furnace structure by means of a heating medium, such as burning gas, and then passing the medium to be heated through the structure so that the heat absorbed by the furnace structure is regenerated and transmitted to the medium to be heated, or which structure may be used by passing both the heating medium and the medium to be heated through different passages in the furnace or oven structure so that an interchange of heat from one medium to the other occurs. The invention relates more particularly to the heat exchange structure of a furnace or oven of this kind.

The objects of this invention are to provide a heat exchange structure for a furnace of this kind, in which the individual units of the structure are of improved construction so that a furnace provided with our structure has a greater area of exposed heating surface per unit of volume than other heat exchange structures heretofore used; also to provide a heat exchange structure of this kind in which the units are so formed that they may be more easily built up to form the structure; also to provide a structure of this kind which requires a smaller number of individual units or pieces than is the case with other structures heretofore used for this purpose; also to improve the construction of furnaces of this kind in other respects hereinafter specified.

In the accompanying drawings,

Fig. 1 is a fragmentary, sectional elevation of a furnace provided with a heat exchange structure embodying our invention.

Fig. 2 is a fragmentary, sectional plan view of the heat exchange structure of the furnace or oven, on an enlarged scale.

Fig. 3 is a fragmentary, sectional elevation thereof on line 3—3, Fig. 2.

Fig. 4 is a perspective view of a single unit of the heat absorbing and transmitting structure of the furnace.

Fig. 5 is a top plan view of a unit of slightly modified construction.

Fig. 6 is a central, sectional elevation thereof.

Fig. 7 is a top plan view of a unit of another modified construction.

Fig. 8 is a central, sectional elevation thereof.

Our improved heat absorbing and transmitting structure may be used in connection with any suitable or desired type of furnace or oven, and Fig. 1 shows our improved structure applied, by way of example, to a furnace or oven of well known construction having substantially cylindrical side walls 10 covered by a dome-shaped roof or top 11. The cylindrical wall 10 is provided with two apertures or ducts 12 and 13 extending through the wall and through which the heating medium or the medium to be heated may be admitted to and discharged from the furnace, the duct 12 leading to the lower portion of an upright passage 14 arranged within the furnace, and the upper end of which terminates near the roof or dome 11. This duct is separated from the other portion of the furnace by means of a vertical wall or partition 15 so that if, for example, a mixture of air and gas for heating the furnace or oven enters the pipe 12, this burning mixture will pass upwardly over the top edge of the partition 15 and then downwardly through a heat exchange chamber 16 which contains the heat absorbing and transmitting structure embodying our invention. This structure may be mounted on the usual base or supporting bars 18 commonly employed in connection with furnaces of this kind between which the air or gas may pass to or from the chamber 16, to or from the openings 13 in the cylindrical wall 10. Any other form of furnace or oven may be used in connection with our improved structure.

Heretofore the chamber 16 of the oven or furnace was generally filled with a checker work of rectangular bricks made of suitable refractory material which were arranged to form a plurality of upright passages through which the gas or air could pass, these bricks being depended upon to absorb heat for a period of time from any suitable medium, such, for example, as a current of burning gas passing downwardly between the bricks, and after the bricks have become sufficiently heated, the supply of gas is shut off and a current of air blown through the furnace or oven, generally in the opposite direction to the flow of heating medium, the bricks giving up their heat to the current of air or gas. We have found, however, that these bricks are of limited capacity, due largely to the fact that a comparatively small portion of the surface of the bricks is exposed to the heating medium or the medium to be heated.

In accordance with our invention the heat exchange or heat absorbing and transmitting structure in the furnace chamber 16 is formed of a plurality of units 20, each of which has an outwardly bowed or rounded exterior surface 21 and the units preferably also have a central aperture 22. These units may be made of any suitable or desired material, depending somewhat upon the particular use to be made of the structure. When used in regenerative ovens, the units are preferably made of a refractory material, such as fire clay, and when so used, the central apertures 22 may be omitted although it is preferred to use units provided with these apertures, since they greatly increase the surface exposed to the heating medium and the medium to be heated, but when used in a recuperative oven, in which the heat is required to pass continuously in one direction from the hot to the cool medium, the units may be made of metal. The upper and lower faces of each unit are preferably flattened, as shown at 24, or otherwise formed so that one unit can readily be seated upon another unit. The contour of the faces 21 of the units may be of any suitable or desired kind, so that the surfaces of the units connecting the edges of the upper and lower flat faces 24 are bowed outwardly, and for this purpose the bowed faces may be of a curved or polyhedral form, but preferably the surfaces are curved substantially spherically about the centers of the units. The units are preferably spaced laterally from each other by means of contacting or engaging surfaces, such as the flat abutting faces 25 shown in the drawings, those shown being formed on the ends of short outwardly extending studs or projections 26 formed on four sides of each unit. Consequently when the units are arranged in a tier as shown in Figs. 1, 2 and 3 the flat faces 25 of one unit will abut against corresponding faces of adjacent units and thus hold the several units in their correct relations to each other. It will be obvious that these side abutments on the units may be formed on any desired number of sides of the units, depending upon the kind of spacing desired between columns or rows of units and the abutting or engaging faces may be made other than flat, if desired.

When a heat exchange structure is built up of these units, the units are arranged in rows, which may extend in a vertical direction as shown in Fig. 1, or in any other direction, and the central apertures 22 of the units of each row will be in alinement, thus forming a series of passages for either the heating medium or the medium to be heated. The outer surfaces of the units are spaced apart so as to form a series of passages 28, any four columns or rows of the units 20 forming between them a passage 28, the walls of these passages 28 being formed by the outwardly bowed portions of the surfaces of the units. Consequently it will be obvious that in these passages 28 a much larger amount of surface is exposed by forming the units with outwardly bowed portions, than would be the case if the outer surfaces of these units were provided with sides extending straight from one end to the other. The structure consequently produces a very large amount of exposed heating surface per unit of volume in the chamber 16 of the furnace, and furthermore all of the exposed heating surface is rounded or polyhedral so that no sharp edges or projections are exposed to the heating medium, which might cause unequal heating of different portions of the units, resulting in chipping or breaking off of portions of the units. Furthermore the rounded surface of the units offer less obstruction to the flow of air or gas through the passages 28, and the air or gas can more easily flow along these rounded surfaces to effect an exchange of heat between the units and the air or gas.

When our improved structure is employed in a furnace such as illustrated in Fig. 1, which is a regenerative furnace, the same medium which flows around the outside of the units of the structure also flows through the central passages 22 therein. However, if it is desired to use the structure in connection with a recuperative furnace or oven in which heat passes continuously in the same direction from one medium to another, one medium may be passed through the central passages 22 while the other medium passes around the outside of the units and through the passages 28 and for this purpose the joints between the flat faces 24 may be sealed by any suitable cement, gaskets, or other sealing material. If desired the units may, however, be made with interfitting parts on their opposite flat faces 24, such as shown in Figs. 5 and 6 in which one of the flat faces is provided with an annular projection 30 and the other side is provided with a corresponding annular recess 31, the projection 30 of a unit being adapted to enter into the recess 31 of an adjacent unit, so as to form a joint or seal between the two units. This seal may be made tighter by use of a suitable packing material or composition.

For certain purposes it may also be desirable to construct the units with the interior bore enlarged so as to increase the surface exposed in the passages through the upright tiers or columns of units and to reduce the thickness of the walls of the units. For this purpose in the construction shown in Figs. 7 and 8 each of the units is provided with a rounded recess or concavity 33. By means of this structure a still greater surface is exposed to the medium passing through the interior of the units, than in the constructions shown in Figs. 1 to 6. This structure is particularly desirable if the units are made of metal and this structure has the further advantage of breaking up the flow of air or gas through the central passages and preventing stratification of the medium passing through the central passages, as is also the case in the passages 28 shown in Fig. 2, in which the undulating passage caused by the bowed exterior surfaces of the units breaks up the column of the air or gas flowing through these passages 28 and provides for a more uniform heating of the air or gas.

The heat exchange structure described is very desirable since the alined apertures in the units, as well as the passages 28 outside of the units can be easily cleaned by means of the usual brushes employed for this purpose. Most portions of the curved outer surfaces 21 can be easily reached by a brush or other cleaning device which is passed through the passages 28. While the units described are particularly well adapted for use in alined rows as shown in Figs. 1 to 3, yet in the case of regenerative ovens operating on clean gases, the units may be used by simply throwing them promiscuously into the heat exchange chamber of an oven.

We have found that our heat exchange structure is of so much greater capacity than that of the checkerwork structure now commonly used, that in many instances where older types of blast furnaces have been replaced by more modern ones of larger capacity, it is not necessary to replace the air heating ovens therefor by new ones of larger sizes since our heat exchange structure, when installed in the older ovens, so increases the capacity of the ovens as to enable them to fully meet the requirements of the larger blast furnaces.

We claim as our invention:—

1. A unit for use in the construction of heat interchange structures for recuperative and regenerative ovens, said unit having a series of faces formed to engage with corresponding faces of adjacent units to form a column of units, said faces being joined by outwardly extending portions adapted to contact with corresponding portions of units in adjacent columns at portions only of their lengths to permit gases to flow both lengthwise and crosswise of said columns.

2. A unit for use in the construction of heat interchange structures for recuperative and regenerative ovens, said unit having a series of faces formed to engage with corresponding faces of adjacent units, said faces being joined by surfaces of substantially spherical curvature.

3. A unit for use in the construction of heat exchange structures for recuperative and regenerative ovens, said unit having a central aperture, ends formed to cooperate with corresponding ends of an adjacent unit, outwardly bowed surfaces connecting said ends, and laterally projecting parts extending outwardly from said bowed surfaces and adapted to engage with corresponding parts of adjacent units.

4. A unit for use in heat exchange structures for recuperative and regenerative ovens, having flat end portions and arcuate convex side surfaces connecting said seats.

5. A unit for use in heat exchange structures for recuperative and regenerative ovens, having flat end seats and an arcuate convex side surface connecting said ends, and bosses projecting outwardly from said convex bowed surface at points approximately midway between said ends and equally spaced from one another peripherally of said side surface.

6. A unit for use in heat exchange structures for recuperative and regenerative ovens, having flattened end portions and arcuate convex bowed side surface connecting said ends, and bosses projecting outwardly from said convex bowed surface at points approximately midway between said ends and equally spaced from one another peripherally of said side surface, said unit also having an interior passage terminating in said ends.

7. A unit for use in the construction of heat exchange structures for recuperative and regenerative ovens, said unit having a central aperture, ends formed to cooperate with corresponding ends of adjacent units, sides joining said ends, and a plurality of projections on said sides and spaced from said ends and adapted to cooperate with corresponding projections of adjacent units to space the sides of adjacent units from each other.

8. A unit for use in the construction of heat interchange structures for recuperative and regenerative ovens, said unit having a series of end faces formed to engage with corresponding end faces of adjacent units, an aperture extending through said unit and terminating in said faces, said unit having sides terminating at said ends, and lateral projections on said sides adapted to engage with corresponding projections on adjacent units to space the sides of adjacent units from each other, the length of said units between the end faces being materially greater than the corresponding dimensions of said projections, so that the major area of said sides is exposed to the medium passing the outer face of said unit.

9. A heat exchange structure for recuperative and regenerative ovens and the like, comprising a heat exchange element having a plurality of relatively straight passages therethrough between opposite faces, with lateral passages connecting said straight passages to one another.

10. A heat exchange structure for recuperative and regenerative ovens and the like, comprising a heat exchange element having a plurality of relatively straight, upright passages therethrough between opposite faces, with lateral passages connecting said straight passages to one another, the bottoms of said lateral passages being inclined towards the straight passages to facilitate cleaning.

11. A heat exchange structure for recuperative and regenerative ovens and the like, comprising a plurality of units arranged in columns side by side to provide a plurality of upright passages between the columns, the units of each column having passages between them to provide lateral passages connecting the upright passages to one another.

VERNE W. AUBEL.
JOHN B. FITZ-GIBBON.